United States Patent

Taga

[11] Patent Number: 4,538,153
[45] Date of Patent: Aug. 27, 1985

[54] DIRECTIVITY DIVERSITY COMMUNICATION SYSTEM WITH MICROSTRIP ANTENNA

[75] Inventor: Tokio Taga, Yokohama, Japan

[73] Assignee: Nippon Telegraph & Telephone Public Corp., Tokyo, Japan

[21] Appl. No.: 414,804

[22] Filed: Sep. 3, 1982

[30] Foreign Application Priority Data

Sep. 7, 1981 [JP] Japan .................. 56-139827
Aug. 3, 1982 [JP] Japan .................. 57-134694

[51] Int. Cl.³ ................................ H01Q 1/38
[52] U.S. Cl. .................. 343/700 MS; 455/277
[58] Field of Search ........... 343/700 MS, 785; 455/277

[56] References Cited

U.S. PATENT DOCUMENTS

3,478,362  11/1969  Ricardi et al. ............ 343/700 MS
4,125,838  11/1978  Kaloi .
4,125,839  11/1978  Kaloi ...................... 343/700 MS
4,318,107  3/1982   Pierrot et al. ............ 343/700 MS

FOREIGN PATENT DOCUMENTS

57-63904  4/1982  Japan ................... 343/700 MS
2005922   4/1979  United Kingdom ....... 343/700 MS

OTHER PUBLICATIONS

IEEE Transactions on Antennas and Propagation, vol. AP-29, No. 1, Jan. 1981.

Primary Examiner—Eli Lieberman
Assistant Examiner—K. Ohralik
Attorney, Agent, or Firm—Armstrong, Nikaido, Marmelstein & Kubovcik

[57] ABSTRACT

An improved diversity communication system which has a single micro-strip antenna has been found. The micro-strip antenna according to the invention comprises a thin dielectric layer sandwiched by a ground conductor plane and a radiation conductor plane, a pair of feed points on the radiation conductor plane through the holes on the ground conductor plane, and said feed points being positioned so that a line between a first feed point and a center of the radiation conductor plane is substantially perpendicular to a line between a second feed point and a center of the radiation conductor plane. Each of the feed points is coupled with each branch input of a diversity receiver, and those feed points operate like separated two antennas, which have a pair of perpendicular directivities. Preferably, a radiation conductor plane is circular with a plurality of slots along the periphery of the same. The feed points of the present micro-strip antenna have little correlation between the same. The present invention is advantageous in particular for mobile communication as the size and/or the height of the antenna is small, and the antenna may be mounted in a housing of a receiver itself.

5 Claims, 17 Drawing Figures

DIRECTIVITY DIVERSITY COMMUNICATION SYSTEM WITH MICROSTRIP ANTENNA

BACKGROUND OF THE INVENTION

The present invention relates to a directivity diversity communication system, which reduces the influence of fading due to the multi-path of electromagnetic wave in a wireless communication. The present invention is useful, in particular, in a mobile communication system in which small equipment size is preferable.

Figure 1:
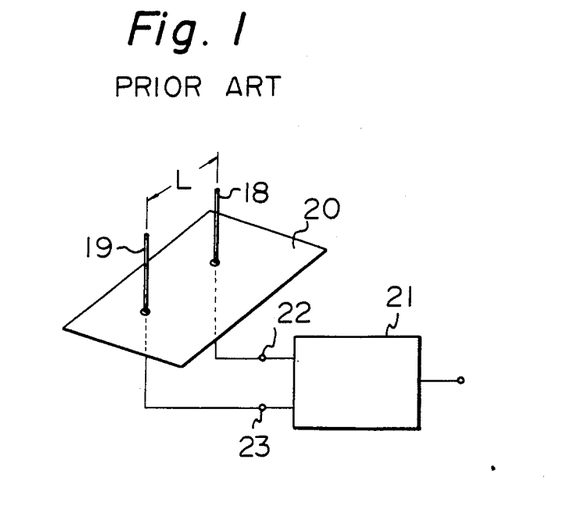
FIG. 1 shows a brief concept of a prior diversity reception system.

In a conventional space diversity reception system, a pair of antennas 18 and 19 spaced (L) longer than several wavelengths have been utilized as shown in FIG. 1. In the figure, the reference numeral 20 is a conductor plane, 21 is a diversity reception circuit having a pair of antenna input branches 22 and 23. The input signals on the input branches 22 and 23 are combined or switched according to a conventional diversity technique, and the combined signal is detected in the receiver, which provides an output signal on the output terminal (OUT).

Figure 2A:
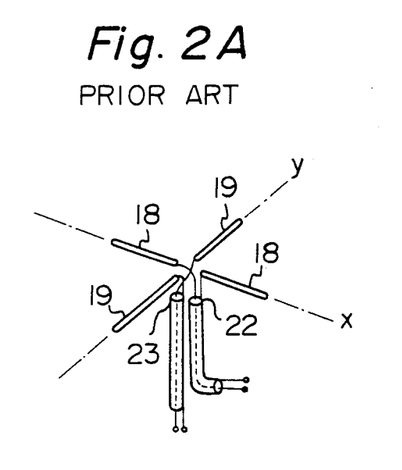
FIG. 2A shows a structure of a prior antenna for a diversity reception system.
Figure 2B:
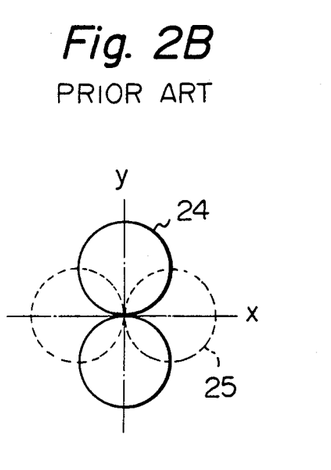
FIG. 2B shows directivity curves of the antenna of FIG. 2A.

FIG. 2A shows a conventional antenna having the perpendicular directivities for a directivity diversity reception system, in which the reference numeral 18 is a first dipole antenna, 19 is a second dipole antenna which is positioned perpendicular to the first dipole antenna 18 as shown in the figure. In the figure, the symbols 22a and 22b are terminals of the first and the second antenna branches 22 and 23, respectively. The first and the second antennas 18 and 19 of FIG. 2A have the perpendicular directivities 24 and 25, respectively, as shown in FIG. 2B, and therefore, those two antenna elements 18 and 19 may be utilized for the antenna branches for a directivity diversity reception system.

However, the antennas and/or the diversity systems shown in FIG. 1 and/or FIG. 2A have the disadvantage that the area of space needed for mounting an antenna is extremely large, and each length of the area of space is longer than ½ wavelength, and therefore, a diversity communication system having that large antenna must be large in size, or an antenna must be installed in a space separated from a receiver housing. Therefore, a prior diversity communication system has not been preferable as a mobile communication system, in which a small sized communication system is desirable.

Further, a prior diversity communication system has the disadvantage that the structure is not sufficiently strong, due to the use of thin linear antennas which are easily broken.

SUMMARY OF THE INVENTION

It is an object, therefore, of the present invention to overcome the disadvantages and limitations of prior diversity systems by providing a new and improved directivity diversity system.

It is also an object of the present invention to provide a directivity diversity system in which an antenna may be installed in a receiver housing itself.

Another object of the present invention is to provide a directivity diversity system which uses a small sized antenna.

The principle concept of the present invention is the use of a micro-strip antenna with a pair of perpendicular feed points.

The above and other objects are attained by a directivity diversity system comprising a micro-strip antenna having a dielectric layer sandwiched by a ground conductor plane and a radiation conductor plane, a pair of feed points provided on said radiation conductor plane so that a radiation directivity pattern by a first feed point is perpendicular to a radiation directivity pattern by a second feed point; a diversity receiver for receiving signals on a pair of input terminals each of which is coupled with said feed points, and each signal on input terminals being combined with another one through a diversity technique.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figure 3A:
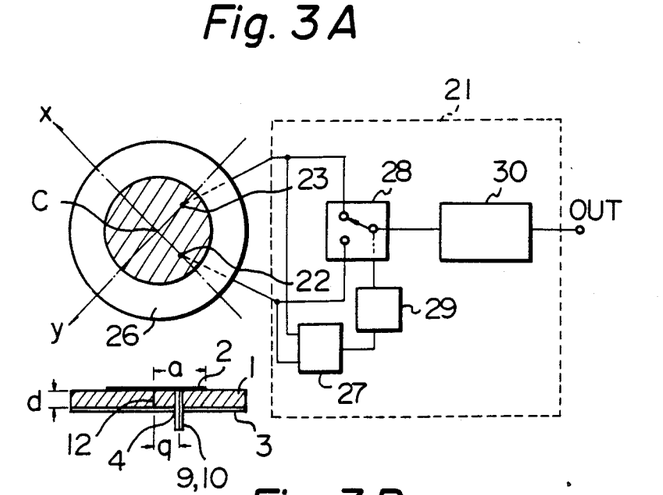
FIG. 3A shows a brief concept of the diversity reception system according to the present invention.
Figure 3B:
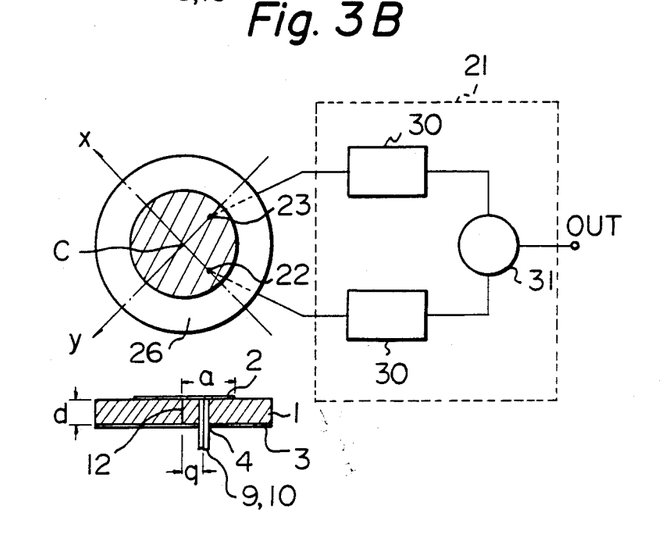
FIG. 3B shows another brief concept of the diversity reception system according to the present invention.

FIGS. 3A and 3B show the first embodiment of the present directivity diversity system, in which a circular micro-strip antenna 26 with two branches or feed points 22 and 23 are utilized. In those figures, the reference numeral 1 is a dielectric layer or an air layer, 2 is a radiation conductor plane, 3 is a ground conductor plane. Those planes 2 and 3 sandwich the dielectric layer 1. The numeral 4 is a through-hole provided on the ground conductor plane 3, 9 and 10 are coaxial cables coupled with the feed points 22 and 23, through the through-holes 4.

The reference numerals 22 and 23 are first and second branches (feed points) of the circular micro-strip antenna 26. The numeral 21 is a diversity receiver, which has a level comparator 27 for comparing the level of the first branch 22 with the level of the second branch 23, a switching circuit 28 for selecting one of the branches 22 and 23, a switching control circuit 29 for controlling the switching circuit 28 so that the branch with the higher level is selected, and a receiver amplifier 30 which may include a detector. The output of the receiver amplifier 30 is applied to an external circuit (not shown) through the output terminal (OUT). The receiver 21 itself is obvious to those skilled in the art, and many modifications are possible.

The branches or the feed points 22 and 23 are provided on the radiation conductor plane 2, to which a coaxial cable 9 or 10 is connected through the small hole 4 on the ground conductor plane 3. Those coaxial cables 9 and 10 which are connected to the feed points 22 and 23 are also coupled with the switching circuit 28 and the comparator 27.

The two feed points 22 and 23 are positioned on the radiation conductor plane 2 so that the line between the center C of the radiation conductor plane 2 and the first feed point 22 is perpendicular to the line between that center C and the second feed point 23. In the embodiment, the first feed point 22 is on the X-axis, and the second feed point 23 is on the Y-axis. Of course, the X-axis is perpendicular to the Y-axis. With the above perpendicular relationship, the radiation pattern (directivity) of the first branch is perpendicular to the radiation pattern of the second branch.

Figure 9A:
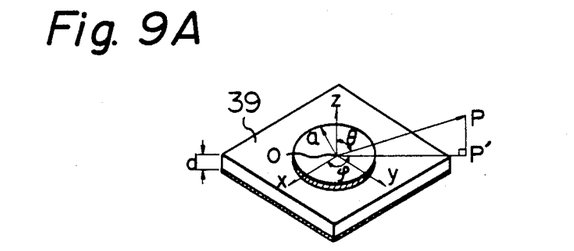
FIG. 9A shows the coordinate system for the explanation of the directivity of the present antenna.

The inner electromagnetic field of the dominant mode ($TM_{110}$ mode) of a circular micro-strip antenna is shown in the equation (1) on the coordinates system of FIG. 9A.

$$\left. \begin{array}{l} E_z = E_0 J_1(k\rho) \cos(\phi + \Phi) \\ H\rho = -\dfrac{j\omega\epsilon}{k^2\rho} E_0 J_1(k\rho) \sin(\phi + \Phi) \\ H\phi = -\dfrac{j\omega\epsilon}{k} E_0 J_1'(k\rho) \cos(\phi + \Phi) \end{array} \right\} \quad (1)$$

In the above equation, $E_0$ is the strength of the excitation, $\omega$ is the angular frequency, $\epsilon$ is a dielectric constant of a dielectric layer, $J_1(x)$ is the first kind Bessel function, $ka$ is a constant ($=1.841$) and $\phi$ is the angle at the feed point.

When the first antenna branch 22 is fed on the X-axis, and the second antenna branch 23 is on the Y-axis, the operation of those branches is given by the equation (1) in which $\phi=0$ and $\phi=\pi/2$ are satisfied respectively.

The mode excited by the first branch 22 on the X-axis gives $E_z=0$ on the Y-axis, and therefore, that mode is not influenced by a feeder on the Y-axis. Similarly, the mode excited by the second branch on the Y-axis gives $E_z=0$ on the X-axis, and that mode is not influenced by a feeder on the X-axis. Thus, the first branch 22 is not coupled with the second branch 23, and those branches operate independently from one another.

The theoretical radiation directivity $D(\theta)$ of the mode excited by the first and the second branches 22 and 23 is shown by the equation (2) on the x-y plane of FIGS. 3A and 3B.

The first branch 22; $D(\theta) \propto \cos\theta$ (2)

-continued

The second branch 23; $D(\theta) \propto \sin\theta$

Thus, the radiation directivity of the first branch is perpendicular to that of the second branch, and it should be noted that those two branches are suitable for implementing a directivity diversity reception system.

In FIGS. 3A and 3B, the radius (a) of the radiation conductor plane 2 is designed to satisfy the following equation (3) to establish the resonant condition.

$$a = 1.841 C/(2\pi f\sqrt{\epsilon_r}) \quad (3)$$

where C is the light velocity, f is the frequency, $\epsilon_r$ is a relative dielectric constant, and the constant 1.841 is the eigen value of the $TM_{110}$ mode. Also, the thickness (d) of the dielectric layer 1 is designed so that $d \leq \lambda/16$, where $\lambda$ is the wavelength. The length q between the center C of the radiation conductor plane 2 and the feed point 22 or 23 is determined so that the impedance of the antenna branch has the desired value.

Preferably, a conductive pin 12 for short-circuiting the center of the radiation conductor plane 2 to the ground conductor plane 1 is provided in order to delete the undesired higher modes. Since the dominant mode $TM_{110}$ has no electric field at the center of the radiation conductor plane, the dominant mode is not influenced by that pin 12.

FIG. 3B is the modification of FIG. 3A, and the diversity receiver 21 of FIG. 3B has a pair of receivers 30 and a combiner 31 which combines the signals of the two branches 22 and 23, and the combined signal is applied to an external circuit (not shown) through the output terminal (OUT).

It should be appreciated that the configuration of the diversity receiver 21 may have many modifications which are obvious to those skilled in the art, and the embodiments of FIGS. 3A and 3B show only two examples.

Figure 4:
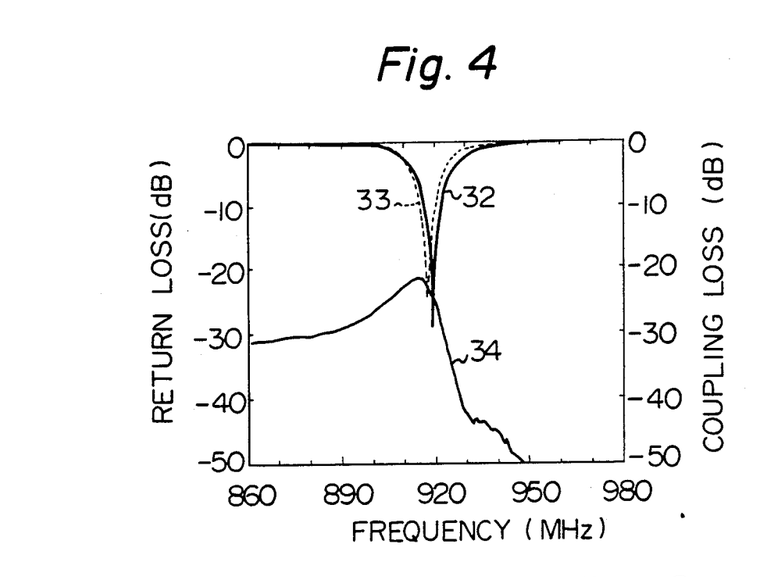
FIG. 4 shows curves of the frequency characteristics of the antenna of the present invention shown in FIGS. 3A and 3B.

FIG. 4 shows the characteristic curves of the microstrip antenna of FIG. 3A or FIG. 3B, in which the horizontal axis shows the frequency, and the vertical axis shows the return loss in dB, and the coupling loss in dB. The return loss is defined to be the ratio of the input power to the reflected power in an antenna, and when the return loss is 0 dB, it shows that all the input power is reflected by an antenna, and when the return loss is negative, it shows some portion of the input power is radiated. The coupling loss is defined to be the ratio of the input power to the first branch to the output power of the second branch. When the coupling loss is 0 dB, all the input power to the first branch is output at the second branch. Therefore, the smaller coupling loss is preferable in a diversity antenna, and when an antenna is used common to a transmitter and a receiver, the coupling loss less than $-30$ dB is preferable.

In FIG. 4, the curve 32 shows the return loss of the first branch 22, the curve 33 shows the return loss of the second branch 23, and the curve 34 shows the coupling loss between the first and the second branches. Some structural data of the micro-strip antenna for the curves of FIG. 4 are that the relative dielectric constant of the dielectric layer 1 is $\epsilon_r=10.3$, the thickness of the dielectric layer 1 is $d=1.27$ mm, the radius (a) of the radiation conductor plane 2 is $a=2.95$ cm, the size of the ground conductor plane 3 is $11.2 \times 11.2$ cm (rectangular). It should be noted in FIG. 4 that the coupling loss in each frequency is less than −20 dB, which is enough for a diversity reception system.

Figure 5A:
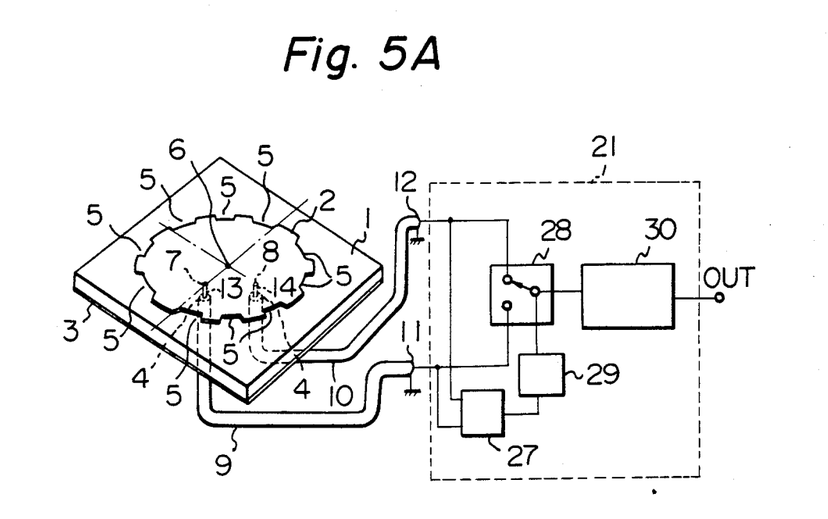
FIG. 5A shows another embodiment of the diversity reception system according to the present invention.
Figure 5B:
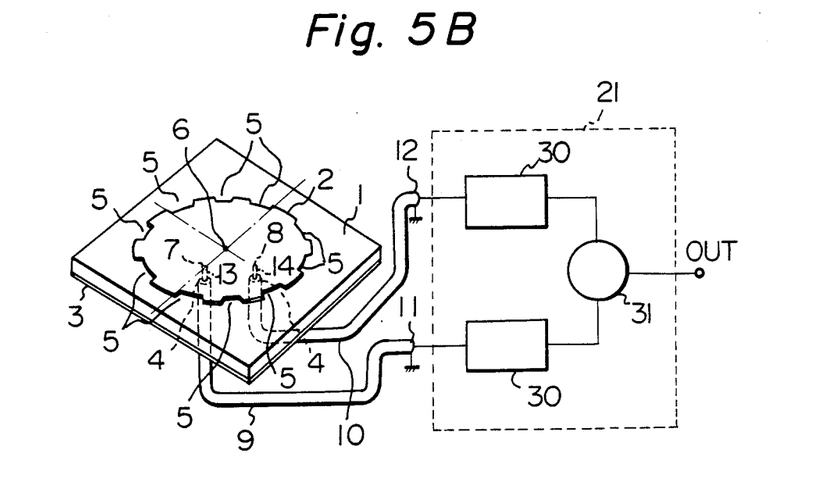
FIG. 5B shows still another embodiment of the diversity reception system according to the present invention.

FIGS. 5A and 5B show other embodiments of the diversity communication system according to the present invention. The feature of the embodiments of FIGS. 5A and 5B is the presence of a plurality of slots 5 provided periodically along the periphery of a circular radiation conductor plane. Other structures of FIGS. 5A and 5B are the same as those of the previous embodiments of FIGS. 3A and 3B.

In FIGS. 5A and 5B, the reference numeral 1 is a dielectric layer or an air layer which is thinner than the wavelength, 2 is the radiation conductor plane, 3 is the ground conductor plane, 4 is a through-hole provided on the ground conductor plane 3, 5 is a slot, 6 is the center of the radiation conductor plane 2, 7 and 8 are feed points provided on the radiation conductor plane 2, 9 and 10 are coaxial feeders, 11 and 12 are feeding terminals, 13 and 14 are feeding pins standing at the feeding points 7 and 8 on the radiation conductor plane 2 coupled with the coaxial feeders 9 and 10.

FIG. 5A is the embodiment of the switching diversity system as shown in FIG. 3A, and FIG. 5B is the embodiment of the combining diversity system as shown in FIG. 3B.

Figure 6:
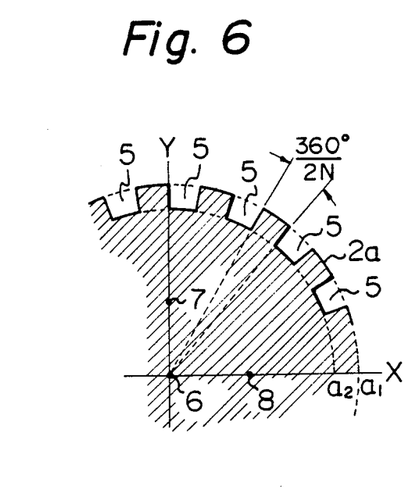
FIG. 6 shows the detailed structure of the radiation conductor plane with slots according to the present invention.

In FIGS. 5A and 5B, the radiation conductor element 2 has a plurality of slots 5 along the periphery of the same so that an alternate arrangement of a slot 5 and a tooth 2 are provided. The number N of the slots is larger than 4, and the center angle of each slot is determined to be 360°/(2N) so that the N number of slots are arranged repetitively with equal angle intervals. Therefore, the shape of each slot is sector-shaped. The depth or the length of each slot is defined by the first radius $a_1$ extending to the outer edge of a slot, and the second radius $a_2$ extending to the inner edge of a slot. In the above notation, the relationship $a_1 > a_2$ is satisfied. The enlarged view of a slot is shown in FIG. 6.

The resonant frequency $f_0$ of the slotted micro-strip antenna is defined by said N number of slots and those values $a_1$ and $a_2$ according to the previous equation (3), and the following relationships are satisfied:

$f_1 \leq f_0 < f_2$      $(a_2/a_1 \geq 0.7)$
$f_0 < MIN(f_1, f_2)$      $(a_2/a_1 < 0.7)$ where $f_1$ is the resonant frequency of a micro-strip antenna with a radiation conductor plane with the radius $a_1$, $f_2$ is the resonant frequency of a micro-strip antenna with a radiation conductor plane with the radius $a_2$, and $MIN(f_1, f_2)$ is the smaller value of $f_1$ and $f_2$.

Figure 7A:
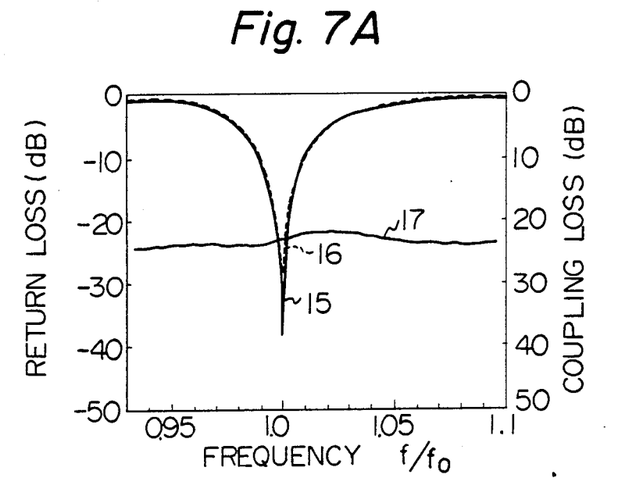
FIG. 7A shows curves of the frequency characteristics of the antenna of FIGS. 3A and 3B.
Figure 7B:
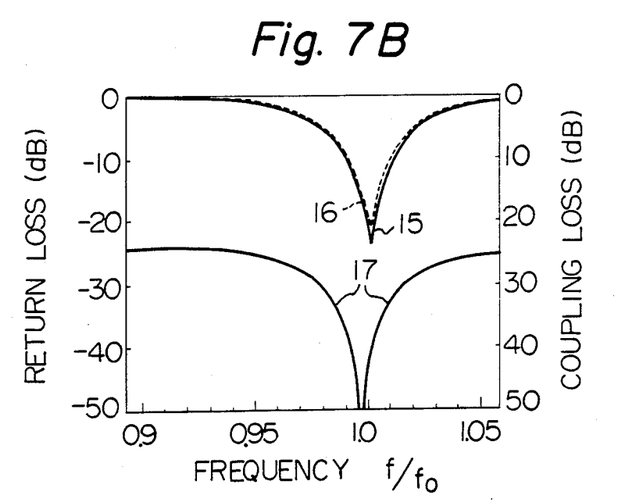
FIG. 7B shows curves of the frequency characteristics of the antenna of FIGS. 5A and 5B.

FIGS. 7A and 7B show the frequency characteristics of the micro-strip antenna in which the thickness of a dielectric layer is d=1.6 mm, and the relative dielectric constant is $\epsilon_r=4.34$. FIG. 7A shows the case of $a_2/a_1=1$, that is to say, no slot is provided as shown in FIGS. 3A and 3B, and FIG. 7B shows the case of $a_2/a_1=0.9$ and N=18 with the structure of FIG. 5A or FIG. 5B. In those figures, the horizontal axis shows the frequency ratio $f/f_0$, and the vertical axis shows the return loss (dB), or the coupling loss (dB). In those figures, the curve 15 shows the return loss at the feed point 11, the curve 16 shows the return loss at the feed point 12, and the curve 17 shows the frequency characteristics of the coupling loss between the feed points 11 and 12.

As comparing FIG. 7B with FIG. 7A, it should be noted that FIG. 7B with the slots on the periphery of the radiation conductor plane provides the coupling loss higher than 40 dB in the operational frequency band, and that coupling loss of FIG. 7B is considerably improved as compared with that of FIG. 7A, which provides only around 20 dB of coupling loss. Also, it should be appreciated that the said value 40 dB of the coupling loss is enough for providing a single antenna commonly used for both a transmission system and a receiving system.

That coupling loss depends upon the number (N) of the slots, and the radiuses $a_1$ and $a_2$.

Figure 8:
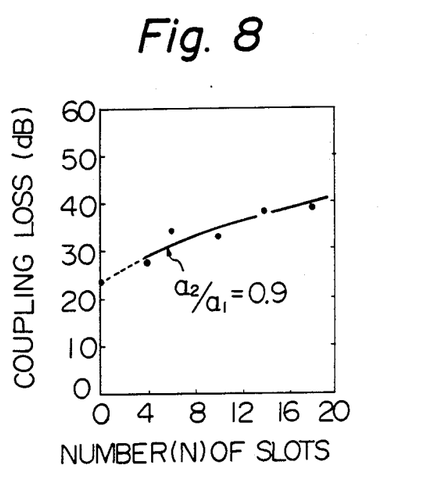
FIG. 8 shows the curve showing the improvement of the coupling loss by the presence of a slot in the antenna of FIG. 6.

FIG. 8 shows the curve of relationship between the number (N) of the slots and the coupling loss (dB) in which the ratio $a_2/a_1$ is 0.9, and the curve of FIG. 8 shows the minimum coupling loss in the operational frequency band which provides the voltage standing wave ratio $V.S.W.R. \leq 1.5$.

It is preferable that the ratio $a_2/a_1$ is in the range between 0.2 and 1, and the number (N) is larger than 4. If the ratio $a_2/a_1$ is less than 0.2, that is to say, if the slots are too deep, the feed points could not be positioned on a circular area of the radiation conductor, but the feed points would be placed on the toothed position, and the characteristics of the antenna would be deteriorated.

It should be understood of course that the numerical embodiments of N, $a_1$ and $a_2$ described above do not restrict the scope of the present invention to merely those numerical values.

Figure 9B:
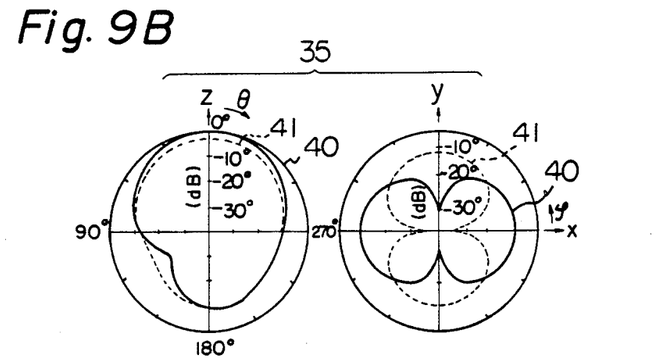
FIG. 9B shows typical radiation patterns of the first branch of the antenna of FIGS. 3A and 3B.
Figure 9C:
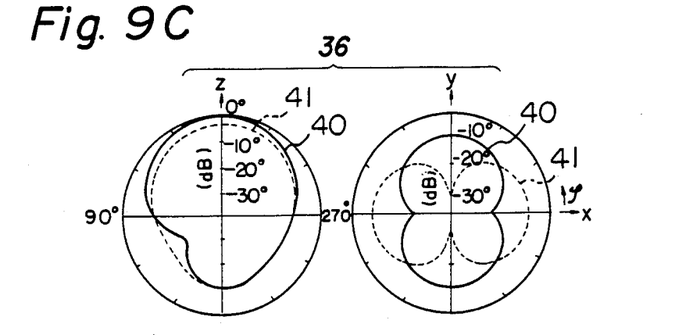
FIG. 9C shows typical radiation patterns of the second branch of the antenna of FIGS. 3A and 3B.

FIGS. 9A, 9B and 9C show the experimental directivity of the circular micro-strip antenna of FIGS. 3A and 3B according to the present invention, and FIG. 9A shows the coordinate system of the antenna, FIG. 9B shows the directivity of the first antenna branch, and FIG. 9C shows the directivity of the second antenna branch. In those figures, the symbol P in FIG. 9A shows the point of measurement with the coordinates (x, y, z), and the angle between OP and OZ is $\theta$, and the angle between OP' and OX is $\phi$. The reference numeral 35 shows the directivity of the first antenna branch, 36 shows the directivity of the second antenna branch, 40 shows the directivity of the vertically polarized wave, and 41 shows the directivity of the horizontally polarized wave. It should be noted in the directivities in the x-y plane in FIGS. 9B and 9C (curves 40 and 41), that the directivity of the first branch is perpendicular to that of the second branch for both the vertically polarized wave and the horizontally polarized wave. Although FIGS. 9B and 9C show the characteristics of a circular micro-strip antenna of FIGS. 3A and 3B, the similar characteristics are obtained in a slotted micro-strip antenna of FIGS. 5A and 5B.

Figures 10, 11:
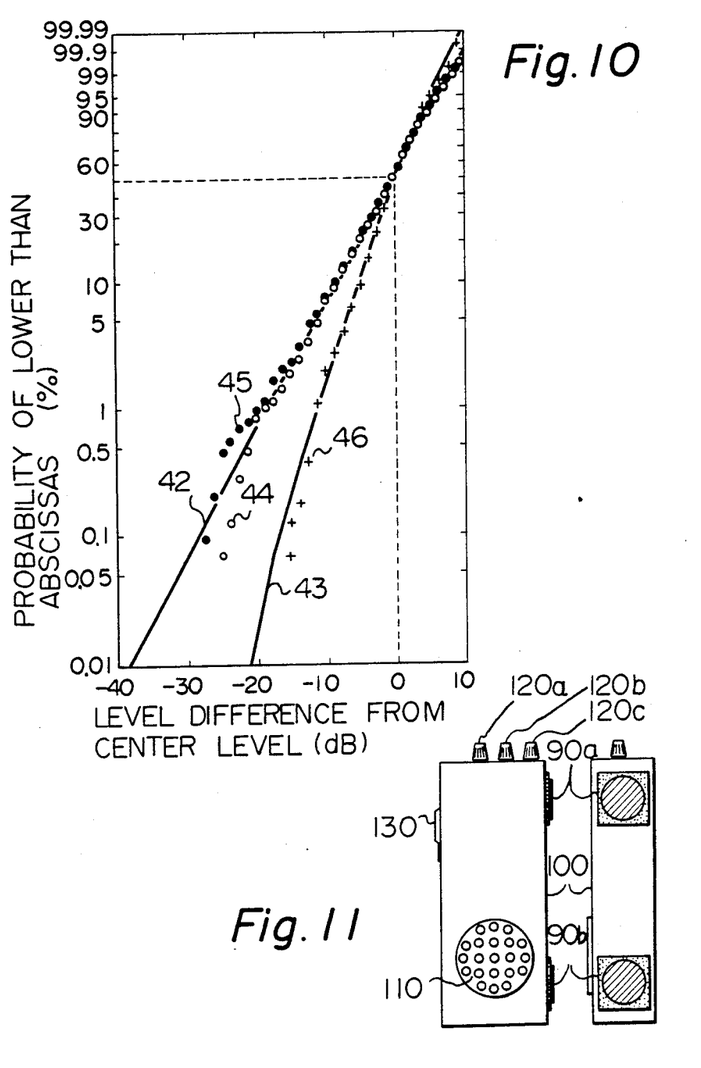
FIG. 10 shows the curve of the improvement for fading in the present diversity system.
FIG. 11 shows the structure of a portable communication system utilizing the present invention.

FIG. 10 shows the cumulative distribution curves of the reception signal on each of the branches of the present micro-strip antenna of FIGS. 3A and 3B, in which the horizontal axis shows the difference level (dB) from the median, and the vertical axis shows the possibility (%) that the level is lower than the corresponding level of the horizontal axis. In FIG. 10, the possibility for the median (0 dB) is 50%, and when the level is lower than the median, the possibility is smaller than 50%. In FIG. 10, the curve 42 shows the theoretical curve of the Rayleigh distribution, the curve 43 shows the theoretical curve when the correlation between two antenna branches is $\rho=0.03$, the white dots 44 show the measured cumulative distribution of the reception level of the first branch, the black dots 45 are the measured cumulative distribution of the second branch, and the symbol (+) 46 shows the measured cumulative distribution of the reception level when the higher level of the first branch and the second branch is selected. It should be noted in FIG. 10 that the dots 44 and 45 of the first and the second reception branches in which no diversity switching is accomplished, follow the Rayleigh curve 42, and the dots 46 in which the switching diversity is performed are considerably improved as compared with the dots of 44 and 45. According to the experiment, the correlation coefficient between the first and the second branches is $\rho = 0.03$, which is very small value, and the measured cumulative distribution 46 show a good agreement with the theoretical curve 43, and therefore, the first branch is almost independent from the second branch. Further, according to the experiment, the medians of the reception signal of the first and second branches are 33.7 dB$\mu$ and 31.4 dB$\mu$, respectively, and therefore, both branches have similar sensitivity.

FIG. 11 shows an external appearance of a wireless communication system utilizing the present directivity diversity system, in which the numeral 100 is a housing, 90a and 90b are micro-strip antennas described in accordance with FIGS. 3A and 3B, or FIGS. 5A and 5B, 110 is a speaker, 120a, 120b, and 120c are knobs for adjusting the apparatus, and 130 is a power switch. As shown in FIG. 11, according to the present invention, a housing 100 may include not only a receiver circuit, but also an antenna for the diversity operation, and therefore, a compact communication system is obtained.

As described above, according to the present invention, a micro-strip antenna having the two branches with the small correlation coefficient, the similar sensitivity, and the complete isolation between the two feed points is obtained, and that antenna is advantageously utilized as a directivity diversity antenna. Further, the present invention has the advantages that a single structure of an antenna is enough for a pair of diversity branches, and the height of an antenna is very low. Therefore, the present antenna may be included in a housing of receiving or transmitting equipment, and a small and excellent portable communication system with high operational reliability using the directivity diversity system is obtained. Thus, the present invention is beneficial for a directivity diversity communication system in mobile communication.

From the foregoing it will now be apparent that a new and improved diversity reception system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A directivity diversity communication system comprising:

(a) a micro-strip antenna having a dielectric layer sandwiched by a ground conductor plane and a circular radiation conductor plane, said circular radiation conductor plane having a plurality of slots provided around the entire circumference thereof, a pair of feed points provided on said radiation conductor plane, said feed points being positioned so that a line between a first feed point and a center of the radiation conductor plane is substantially perpendicular to a line between a second feed point and a center of the radiation conductor plane, so that a radiation pattern by a first feed point is perpendicular to a radiation pattern by a second feed point, (b) a diversity receiver for receiving signals on a pair of input terminals, each of which is coupled with one of said feed points and each of the signals on an input terminal being combined with another on another input terminal through a diversity technique.

2. A micro-strip antenna for a directivity diversity communication system with a pair of feed points comprising:

(a) a dielectric layer which is thinner than the length of the wavelength, (b) a ground conductor plane and a circular radiation conductor plane sandwiching said dielectric layer, (c) said radiation conductor plane having a more than four slots along a periphery of the same with an equal interval, (d) a pair of feed points provided on said radiation conductor plane through a pair of through-holes on said ground conductor plane and, (e) said feed points being positioned on said radiation conductor plane so that a line between a first feed point and a center of the radiation conductor plane is substantially perpendicular to a line between a second feed point and a center of the radiation conductor plane.

3. A micro-strip antenna for a directivity diversity communication system according to claim 2, wherein the ratio ($a_2/a_1$) of an inner radius between a center of a radiation conductor plane and an inner edge of the slots, to an outer radius ($a_1$) between a center of a radiation conductor plane and an outer edge of the slots, is greater than or equal to 0.2 and less than 1.0.

4. A micro-strip antenna for a directivity diversity communication system according to claim 2, wherein said ratio ($a_2/a_1$) is 0.9, and the number (N) of the slots is 18.

5. A micro-strip antenna for a directivity diversity communication system according to claim 2, wherein the center angle of each slot is $360°/(2N)$, and the center angle of each duration between two slots is also $360°/(2N)$, where N is the number of slots.

* * * * *